United States Patent
Itagaki

(10) Patent No.: US 8,958,123 B2
(45) Date of Patent: Feb. 17, 2015

(54) IMAGE FORMING APPARATUS

(75) Inventor: Tomohisa Itagaki, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/603,824

(22) Filed: Sep. 5, 2012

(65) Prior Publication Data
US 2013/0094036 A1   Apr. 18, 2013

(30) Foreign Application Priority Data

Oct. 14, 2011   (JP) ................................ 2011-227432

(51) Int. Cl.
*H04N 1/60* (2006.01)

(52) U.S. Cl.
CPC .................................... *H04N 1/605* (2013.01)
USPC ........................................... 358/1.9; 358/504

(58) Field of Classification Search
None
See application file for complete search history.

(56) References Cited

U.S. PATENT DOCUMENTS

| | | | | |
|---|---|---|---|---|
| 5,809,366 | A * | 9/1998 | Yamakawa et al. | 399/39 |
| 6,215,562 | B1 * | 4/2001 | Michel et al. | 358/1.9 |
| 6,731,888 | B2 * | 5/2004 | Suzuki et al. | 399/49 |
| 7,015,927 | B2 * | 3/2006 | Matsushiro et al. | 345/600 |
| 7,298,893 | B2 * | 11/2007 | Kagawa et al. | 382/167 |
| 8,305,664 | B2 * | 11/2012 | Yasunaga | 358/518 |
| 2009/0296174 | A1 * | 12/2009 | Yasunaga | 358/518 |
| 2011/0164285 | A1 | 7/2011 | Itagaki | |
| 2012/0314227 | A1 | 12/2012 | Zaima et al. | |
| 2012/0321331 | A1 | 12/2012 | Shirafuji et al. | |

FOREIGN PATENT DOCUMENTS

| | | |
|---|---|---|
| JP | 11-75067 A | 3/1999 |
| JP | 2007-27211 A | 2/2007 |
| JP | 2010-52304 A | 3/2010 |

* cited by examiner

*Primary Examiner* — Kimberly A Williams
(74) *Attorney, Agent, or Firm* — Fitzpatrick, Cella, Haper & Scinto

(57) ABSTRACT

The present invention provides an image forming apparatus that forms a test pattern for controlling the amount of color material, suppresses increase of the color material amount, and prevents image defects such as spattering, poor fixation due to granularity, or the like. To accomplish this, the image forming apparatus forms a test pattern on printing material using color material of a plurality of colors, reads the formed test pattern, and controls the color material amount of each color by changing an image forming condition in accordance with a result of the reading. Note that the image forming apparatus forms a mixed pattern image using color material of a plurality of chromatic colors, and controls the amount of color material of a single color based on the mixed pattern image.

15 Claims, 18 Drawing Sheets

F I G. 4
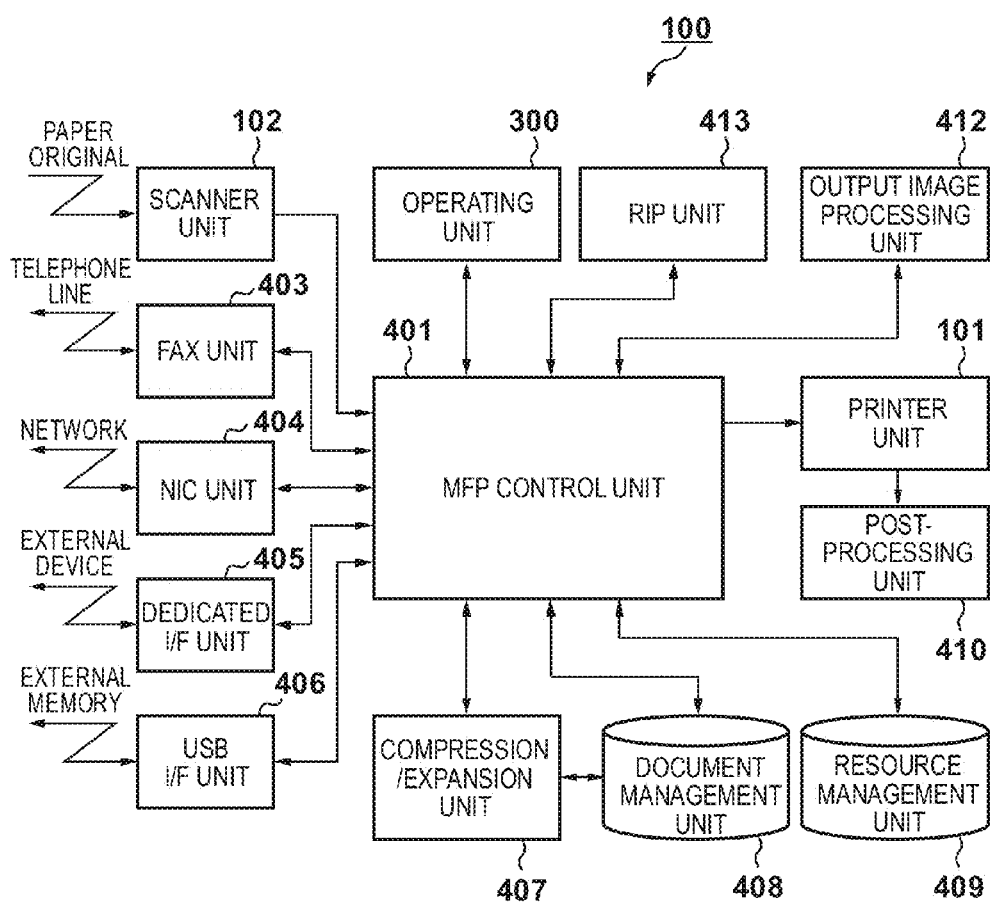

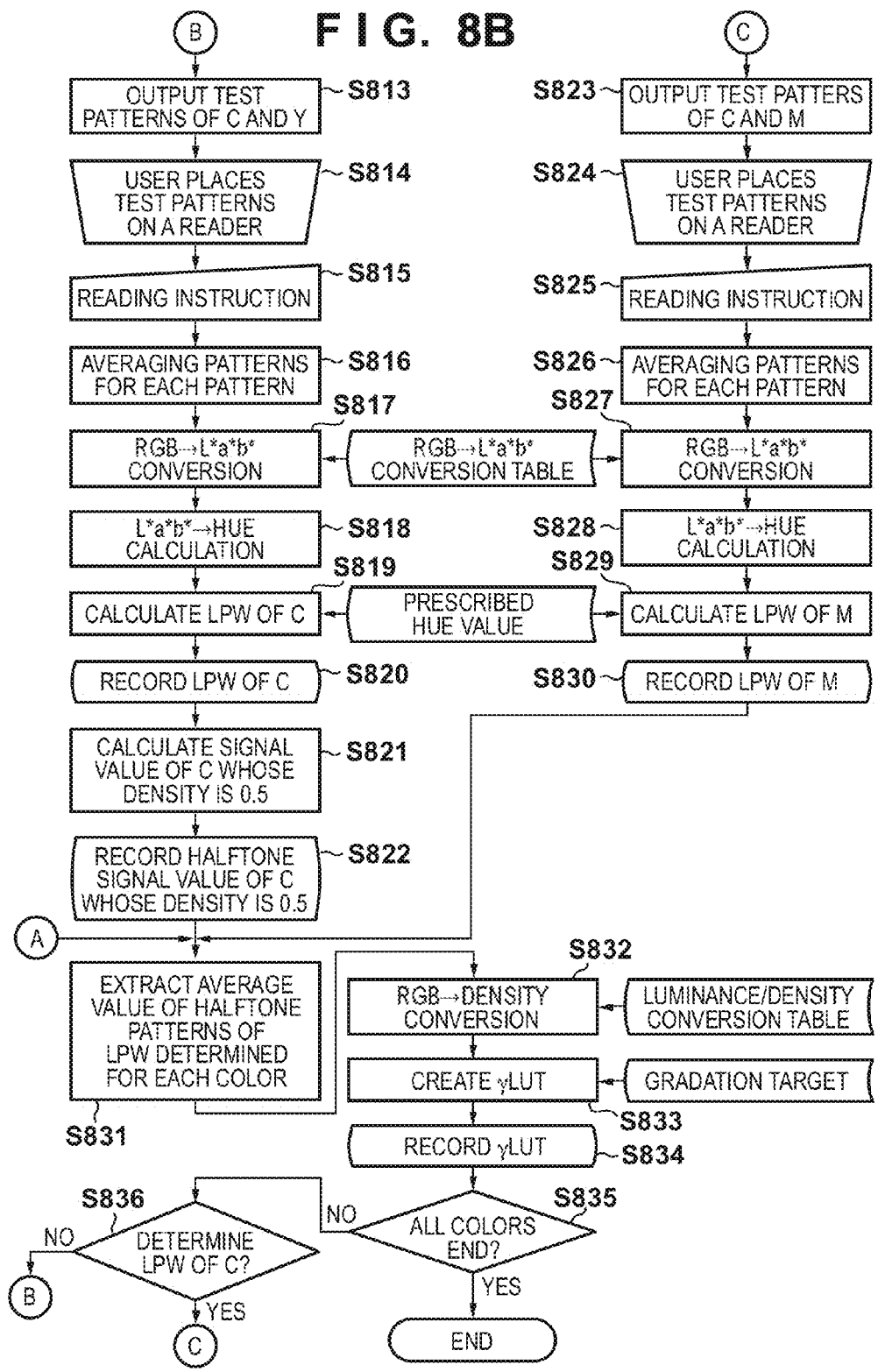

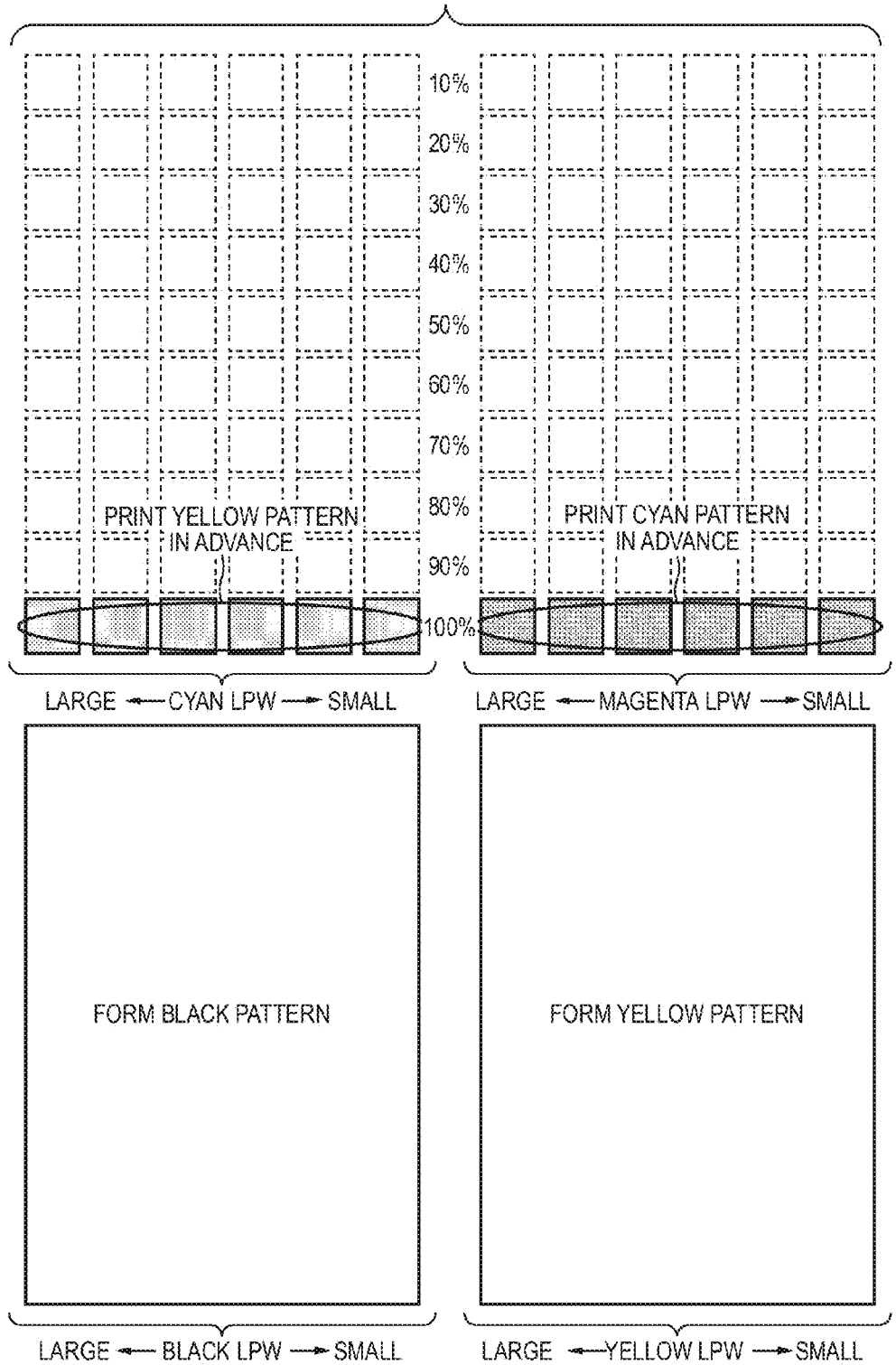

IMAGE FORMING APPARATUS

BACKGROUND OF THE INVENTION

1. Field of the Invention

The present invention relates to an image forming apparatus that prints color material such as toner or the like on a paper sheet.

2. Description of the Related Art

With an image forming apparatus in which an electrophotographic method is adopted, an image carrier called a photosensitive body is charged by a primary charger, and a latent image is formed on the image carrier by an optical system such as a laser or the like. The latent image is developed by a development unit having color material called toner on the image carrier using the toner. Toner that has been developed and held on the image carrier is transferred on a paper sheet by one or two transfers, and fixed to the paper sheet by a thermal fixing apparatus. In a basic printing process of an electrophotographic method, since the above-mentioned electrostatic development is used, the process is easily influenced by temperature and humidity. Therefore, a lot of techniques for stabilizing the printing process have been proposed in order to solve the above-mentioned unstability. For example, Japanese Patent Laid-Open No. 11-75067 proposes a stabilization technique in an electrophotographic image forming apparatus having automatic gradation correction.

With automatic gradation correction, a plurality of pattern images are output on a paper sheet, the pattern images are read with a RGB color reader, and pieces of RGB luminance information that are in a complementary color relationship (red→cyan, green→magenta, blue→yellow, green→black) are extracted. The extracted luminance information is converted into density information with a LUT (lookup table, hereinafter, referred to as "luminance/density conversion table") in which the relationships between luminance and density that are held in advance is expressed. The density conversion performed for each pattern image, a printing condition for obtaining the desired density is calculated, and the printing condition is registered as the printing condition for subsequent printing. The above-mentioned density is influenced by the uneven surface and spectral characteristics (whiteness and the like) of a paper sheet. Therefore, even if the maximum density is adjusted, the maximum amount of color material will not necessarily be a prescribed amount. Japanese Patent Laid-Open No. 2007-27211 proposes a technique for controlling the density to be a prescribed value and color material to be a prescribed amount by executing CAL (calibration) with use of CAL-dedicated media in which whiteness and unevenness are managed.

However, there are the following problems in the conventional techniques. With a conventional method for determining the maximum amount of color material using density, since the resolution particularly in high density portions is insufficient due to a relationship between the spectral reflectance of color material and the spectral sensitivity of a reader, the precision is not sufficient. As shown in reference numeral 1101 of FIG. 11, even if the amount of color material changes, spectral characteristics in the maximum density portion have change little in the detected spectral wavelength ranges, and density values vary due to lifting of a test chart or influence of various types of noises, and thus it has not been possible to grasp the accurate amount of color material. As a result, variation occurs in the result of correcting the maximum amount of color material, leading to an increase in the amount of color material, and spattering, poor granularity, and poor fixation of color material.

SUMMARY OF THE INVENTION

The present invention enables realization of an image forming apparatus that forms a test pattern for controlling the amount of color material with taking spectral characteristics of colors into consideration, suppresses an increase in the color material amount, and prevents image defects such as spattering, poor fixation related to granularity of color material, or the like.

One aspect of the present invention provides an image forming apparatus that forms an image using color material of a plurality of colors, the image forming apparatus comprising: an image forming unit that forms a test pattern on printing material using the color material of a plurality of colors; a reading unit that reads the test pattern formed by the image forming unit on the printing material; and a control unit that controls an amount of color material of each color by changing an image forming condition in accordance with a result of reading by the reading unit, wherein the image forming unit forms a mixed pattern image, as the test pattern, in which color material of a plurality of chromatic colors are used, and the control unit controls an amount of color material of a single color based on a result of reading the mixed pattern image by the reading unit.

Another aspect of the present invention provides an image forming apparatus that forms an image using color material of a plurality of colors, the image forming apparatus comprising: an image forming unit that forms a test pattern on printing material using the color material of a plurality of colors; a reading unit that reads the test pattern formed by the image forming unit on the printing material; and a control unit that controls an amount of color material of each color by changing an image forming condition in accordance with a result of reading by the reading unit, wherein the image forming unit forms a mixed pattern image by forming the test pattern on printing material of a chromatic color, and the control unit controls an amount of color material of a single color based on a result of reading the mixed pattern image by the reading unit.

Still another aspect of the present invention provides an image forming apparatus that forms an image using color material of a plurality of colors, the image forming apparatus comprising: an image forming unit that forms a test pattern on printing material using the color material of a plurality of colors; a reading unit that reads the test pattern formed by the image forming unit on the printing material; and a control unit that controls an amount of color material of each color by changing an image forming condition in accordance with a result of reading by the reading unit, wherein the image forming unit forms a mixed pattern image by superimposing the test pattern on printing material on which a pattern image of a chromatic color is formed, and the control unit controls an amount of color material of a single color based on a result of reading the mixed pattern image by the reading unit.

Further features of the present invention will be apparent from the following description of exemplary embodiments with reference to the attached drawings.

BRIEF DESCRIPTION OF THE DRAWINGS

FIG. 4 is a schematic block diagram of an image forming apparatus according to the first embodiment.

FIGS. 8A and 8B are flowcharts of an example 1 according to the first embodiment.

FIG. 17 is an illustrative diagram showing test charts according to a third embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Configuration of Image Forming Apparatus

Figure 1:
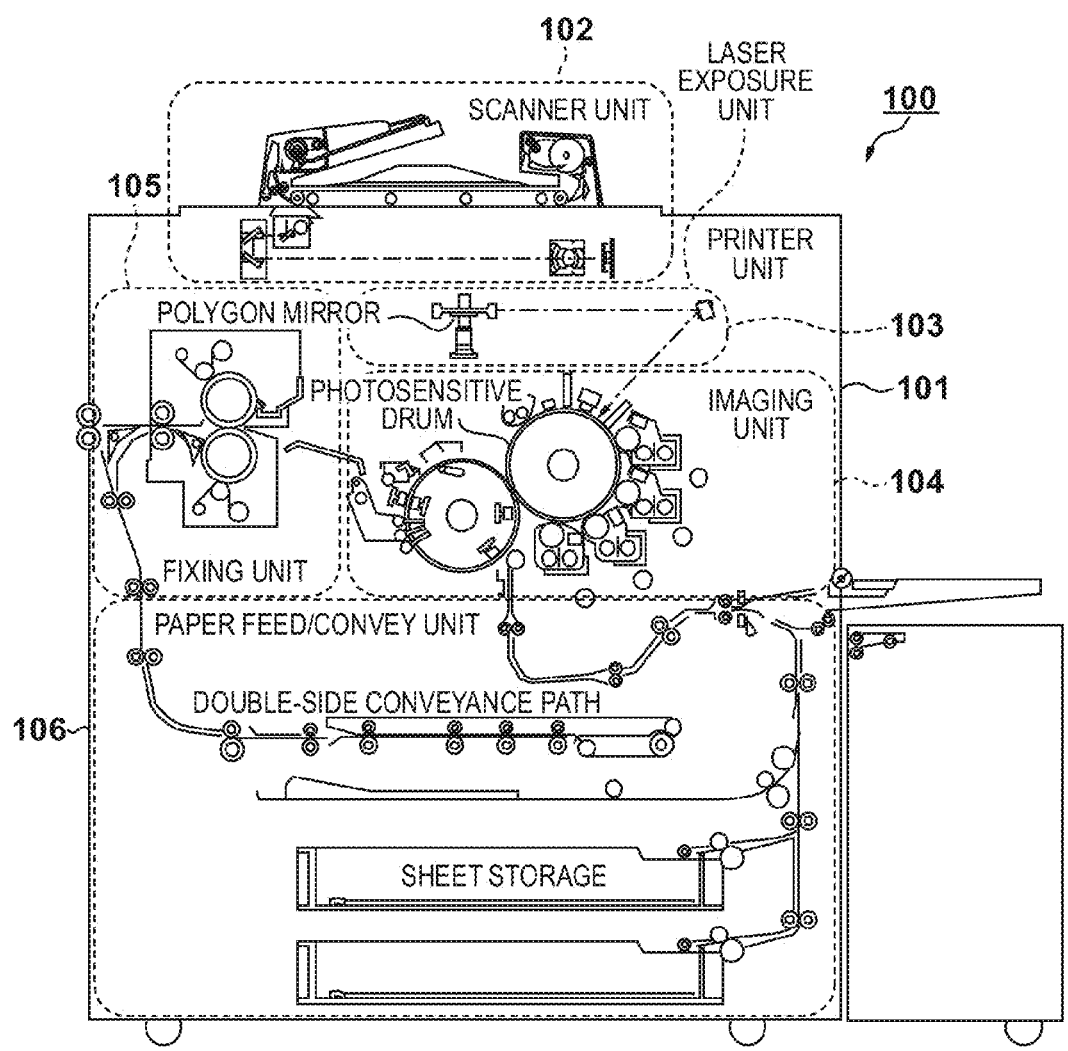
FIG. 1 is a schematic diagram of an image forming apparatus according to a first embodiment.

First, a configuration of an MFP 100 having an electrophotographic printer unit 101 and a scanner unit 102 is described below with reference to FIG. 1. Here, the description is given using the MFP (multi-function peripheral) 100 as one example of image forming apparatuses. The printer unit 101 is configured with a laser exposure unit 103, an imaging unit 104, a fixing unit 105, a paper feed/convey unit 106, and a printer control unit for controlling these units. The scanner unit 102 reads an image of the original optically by irradiating the original placed on a platen with light, and converts the image into a RGB color electrical signal to form image data. The resolution of the scanner unit 102 is 600 dpi.

The laser exposure unit 103 causes light such as laser light or the like that is modulated according to image data to be incident on a rotary multifaceted mirror (polygon mirror) that rotates at an equiangular velocity, and irradiates the surface of a photosensitive drum (image carrier) with the incident light as reflection scanning light. The imaging unit 104 drives the photosensitive drum in a rotary manner, charges the photosensitive drum by a charger, and develops an electrostatic latent image that is formed on the photosensitive drum by the laser exposure unit 103 by toner. Additionally, the imaging unit 104 transfers the toner image (developer image) to a sheet (printing material), and forms an image by executing sequential electrophotographic processes in which minute amounts of toner that is not transferred and remains on the photosensitive drum is recovered. At that time, while the sheet is wound around a predetermined position of a transfer belt and rotated four times, development units (development stations) having yellow (Y) toner, magenta (M) toner, cyan (C) toner, and black (B) toner repeatedly execute the above-described electrophotographic processes sequentially in turn.

After being rotated four times, the sheet to which a full-color toner image has been transferred separates from a transfer drum, and is conveyed to the fixing unit 105. The fixing unit 105 is configured by combinations of rollers and belts, has a built-in heat source such as a halogen heater or the like, and melts and fixes toner on the sheet to which the toner image is transferred with the imaging unit 104 by heat and pressure.

The paper feed/convey unit 106 has one or more sheet storages such as sheet cassettes or paper decks, separates one sheet from among a plurality of sheets stored in the sheet storages in accordance with an instruction of the printer control unit, and conveys the separated sheet to the imaging unit 104 and the fixing unit 105. The sheet is wound around the transfer drum of the imaging unit 104, and is conveyed to the fixing unit 105 after the sheet is rotated four times. While the sheet is rotated four times, the above-described YMCK toner images are transferred to the sheet. Also, in the case of forming an image on both sides of the sheet, the sheet that has passed the fixing unit 105 is controlled so as to pass along a conveyance path for again conveying the sheet to the imaging unit 104.

The printer unit 101 has a built-in printer control unit (not shown), communicates with an MFP control unit that controls the whole MFP, and executes control in accordance with an instruction of the MFP control unit. Additionally, while managing states of the above-described scanner unit, laser exposure unit, imaging unit, fixing unit, and paper feed/convey unit, the printer unit 101 gives an instruction so that the MFP can remain coordinated and operate smoothly as a whole.

Note that at the time of automatic gradation correction using a plurality of colors, which is described later, hue is calculated using RGB information input to a CCD sensor of the above-mentioned scanner unit 102. Also, color material according to the present invention constitutes polyester resin of 80-90%, and as coloring material, inorganic substances that are used for black serving as an achromatic color and organic pigments that are used for yellow/magenta/cyan serving as chromatic colors. Magenta (M): quinacridone, cyan (C): phthalocyanine blue, yellow (Y): disazo yellow, and black (K): carbon black. In the present invention, although the description is given using the above color material, any color material (color pigment or dye) that satisfies the configuration of the present invention may be used. For example, organic pigments can be used such as rhodamine lake, methyl violet lake, quinoline yellow lake, malachite green lake, alizarin lake, carmine 6B, lake red C, disazo yellow, lake red 4R, cromophtal yellow 3G, cromophtal scarlet RN, nickel azo yellow, benzimidazolone azo, permanent orange HL, phthalocyanine blue, phthalocyanine green, flavanthrone yellow, thioindigo bordeaux, perinone red, dioxazine violet, quinacridone red, naphthol yellow S, pigment green B, lumogen yellow, signal red, alkaline blue, aniline black, monoazo yellow, disazo yellow, carmine, quinacridone, rhodamine, copper phthalocyanine, or the like. The chromaticity of the toner is mainly determined by the above-mentioned resins and pigments.

Configuration of Scanner Unit

Figure 2:
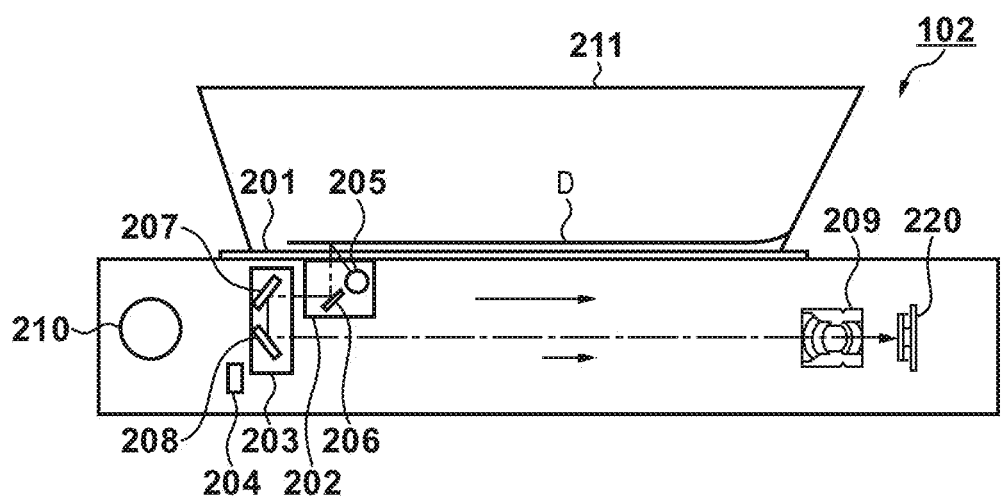
FIG. 2 is a schematic diagram of a reading unit according to the first embodiment.

Next, the configuration of the scanner unit 102 mounted on the upper portion of the printer unit 101 is described below with reference to FIG. 2. In FIG. 2, an original D that is to be read is placed on a platen glass 201, and a scanning operation starts, triggered by a start key of an operating unit 300 described later using FIG. 3 being pressed or an OK key of a scanner driver being pressed.

When a scanning operation starts, a first mirror unit 202 and a second mirror unit 203 temporarily return to a home position where a home position sensor 204 is located, and an original illumination lamp 205 is turned on so that the original D is irradiated with light. Light reflected from the original D passes through a lens 209 to form an image on a CCD sensor 220 via a first mirror 206 of the first mirror unit 202, and a second mirror 207 and a third mirror 208 of the second mirror unit 203, and is input to the CCD sensor 220 as a light signal. Note that movement of the first mirror unit 202 and the second mirror unit 203 is driven by a scanner motor 210.

Configuration of Operating Unit

Figure 3:
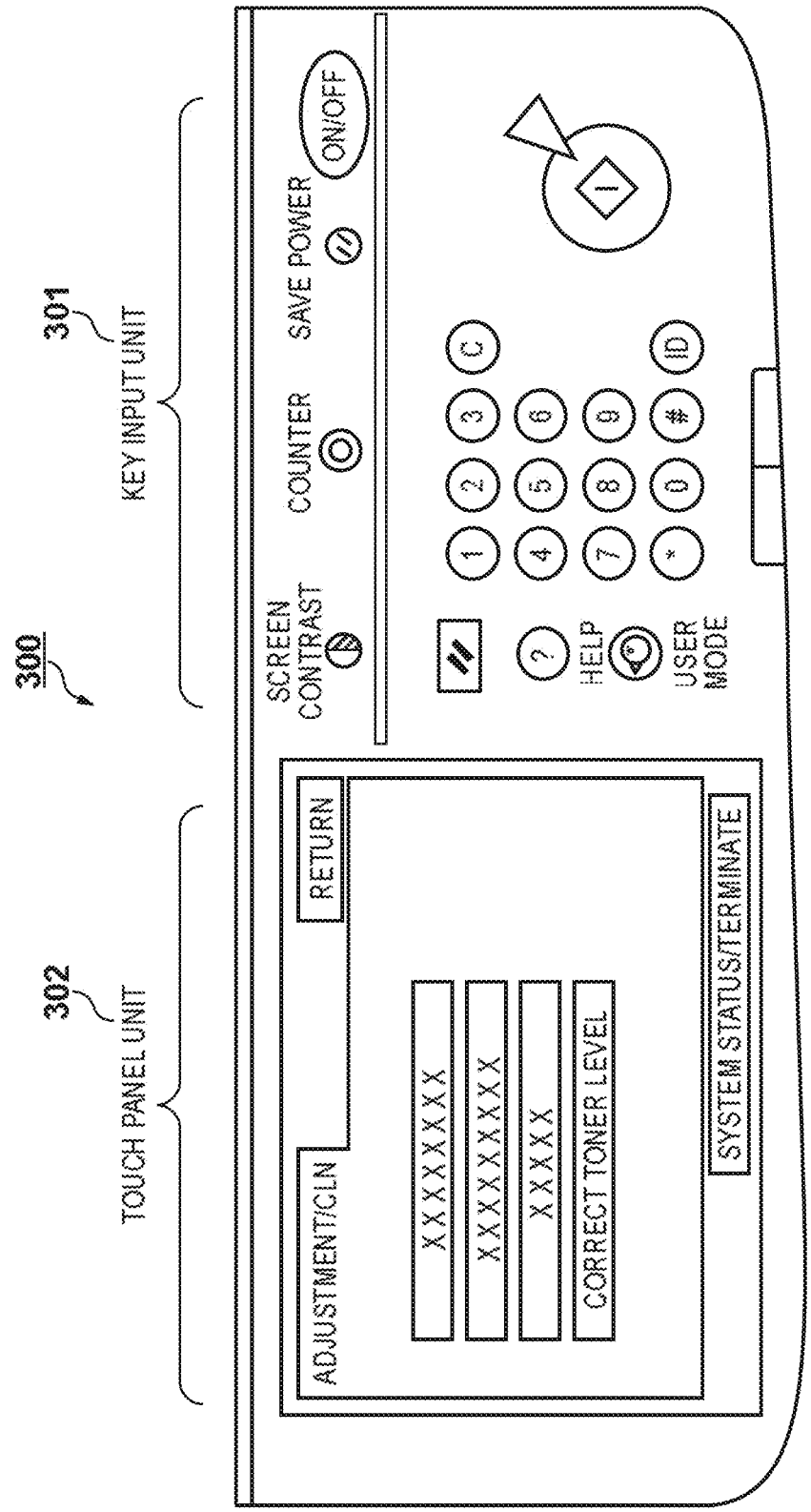
FIG. 3 is a schematic diagram of an operating unit according to the first embodiment.

Next, the configuration of the operating unit 300 provided in the MFP 100 is described with reference to FIG. 3. As shown in FIG. 3, the operating unit 300 includes a key input unit 301 and a touch panel unit 302 serving as a display unit. The key input unit 301 is provided with various types of hardware keys such as a numeric keypad, a power key, a start key, and the like. The touch panel unit 302 includes a liquid crystal touch panel, and can display software keys and accept operations by a user.

Configuration for Controlling Image Forming Apparatus

Next, the configuration for controlling the MFP 100 is described below with reference to FIG. 4. The MFP 100 includes an interface that is capable of connecting with a network, and an image processing unit that executes various types of image processing. The MFP 100 includes a memory such as a hard disk or the like that can store data on a plurality of jobs in the MFP 100, and has a copy function that enables printing of job data output from the scanner unit 102 with the printer unit 101 via the memory. Additionally, the MFP 100 has a plurality of functions such as a printing function that enables printing of job data output from an external device such as a computer or the like with the printer unit 101 via the memory.

As shown in FIG. 4, the MFP 100 includes, as interfaces with external devices, the scanner unit 102, a FAX unit 403, an NIC unit 404, a dedicated I/F unit 405, and a USB I/F unit 406. The scanner unit 102 reads an image of an original or the like, and performs image processing on the read image data. The FAX unit 403 transmits and receives an image with use of a telephone line typified by a facsimile or the like. The NIC (network interface card) unit 404 exchanges image data and device information with use of a network. The dedicated interface unit (dedicated I/F unit) 405 exchanges information such as image data or the like with an external device. The USB interface (USB I/F) unit 406 transmits and receives image data or the like with a USB device such as a USB (universal serial bus) memory (one type of removable media).

Also, the MFP 100 includes, as a control configuration, the printer unit 101, an MFP control unit 401, the operating unit 300, a RIP unit 413, an output image processing unit 412, a post-processing unit 410, a compression/expansion unit 407, a document management unit 408, and a resource management unit 409. The MFP control unit 401 is a so-called CPU that plays a role of regulating traffic such as temporarily storing image data and determining a path according to usage of the MFP 100. The document management unit 408 is provided with a memory such as a hard disk or the like that can store a plurality of image data. The MFP control unit 401 controls image data sent from the above-described interfaces such that the data is stored in the hard disk, for example. Also, the MFP control unit 401 appropriately reads out image data managed with the document management unit 408, that is, the image data stored in the above-mentioned hard disk, transfers the read out data to an output unit of the printer unit 101, and controls output processing such as printing processing or the like performed by the printer unit 101 so as to be executable. Additionally, the MFP control unit 401 controls the image data read out from the hard disk so as to be transferable to an external device such as a computer, another image forming apparatus, or the like by an instruction given from an operator.

The compression/expansion unit 407 performs processing such as compressing and storing image data when storing the image data in the document management unit 408, and expanding compressed data to original image data when reading out image data that is compressed and stored. Also, upon receiving compressed data in a format such as JPEG, JBIG and ZIP via a network, the compression/expansion unit 407 extracts (expands) the data.

Also, the resource management unit 409 stores various types of parameter tables or the like including a font and a gamma table that are commonly shared, and can call these tables as needed, and store, modify and update a new parameter table.

At the time of automatic gradation correction, a test pattern is produced by the output image processing unit 412, and output information is transmitted to the printer unit 101 and is output by the printer unit 101. Here, a user scans the output test pattern with the scanner unit 102. The data scanned by the scanner unit 102 is sent to the output image processing unit 412 that calculates the actual amount of color material, and the output image processing unit 412 produces information on correction of the color material amount and stores the information in the resource management unit 409. The MFP control unit 401 transmits the color material amount correction information stored in the resource management unit 409 to the printer unit 101.

The MFP control unit 401, when PDL data is input, performs RIP (raster image processor) processing with the RIP unit 413 and image processing for printing an image to be printed with the output image processing unit 412 as needed. Additionally, intermediate data or print-ready data (bitmap data to be printed or compressed data) of image data created at that time can be re-stored in the document management unit 408 as needed. Then, the re-stored data is sent to the printer unit 101 that forms an image. A sheet printed out by the printer unit 101 is sent to the post-processing unit 410, and processing for sorting and finishing sheets is performed.

Here, the MFP control unit 401 plays a role of circulating jobs smoothly, and path switching is performed as described below, in accordance with the way in which the MFP 100 is used. However, although it is generally known that image data is stored as intermediate data as needed, access other than where the document management unit 408 serves as the starting point or the ending point are not described here. Also, the path is described such that a rough flow can be understood by omitting the processing of the compression/expansion unit 407 and the post-processing unit 410 that are used as needed, or the MFP control unit 401 serving as the overall core. A) Copy function: scanner unit 102→output image processing unit 412→printer unit 101; B) FAX transmitting function: scanner unit 102→FAX unit 403; C) FAX receiving function: FAX unit 403→output image processing unit 412→printer unit 101; D) Network scan: scanner unit 102→NIC unit 404; E) Network print: NIC unit 404→RIP unit 413→output image processing unit 412→printer unit 101; F) Scan to external device: scanner unit 102→dedicated I/F unit 405; G) Print from external device: dedicated I/F unit 405→output image processing unit 412→printer unit 101; H) Scan to external memory: scanner unit 102→USB I/F unit 406; I) Print from external memory: USB I/F unit 406→RIP unit 413→output image processing unit 412→printer unit 101; J) Scan box function: scanner unit 102→output image processing unit 412→document management unit 408; K) Box print function: document management unit 408→printer unit 101; L) Box receiving function: NIC unit 404→RIP unit 413→output image processing unit 412→document management unit 408; M) Box transmitting function: document management unit 408→NIC unit 404; N) Preview function: document management unit 408→operating unit 300; O) Color material amount correction: output image processing unit 412→printer unit 101→scanner unit 102→output image processing unit 412→resource management unit 409→printer unit 101.

Configuration for Controlling Scanner Unit

Figure 5:
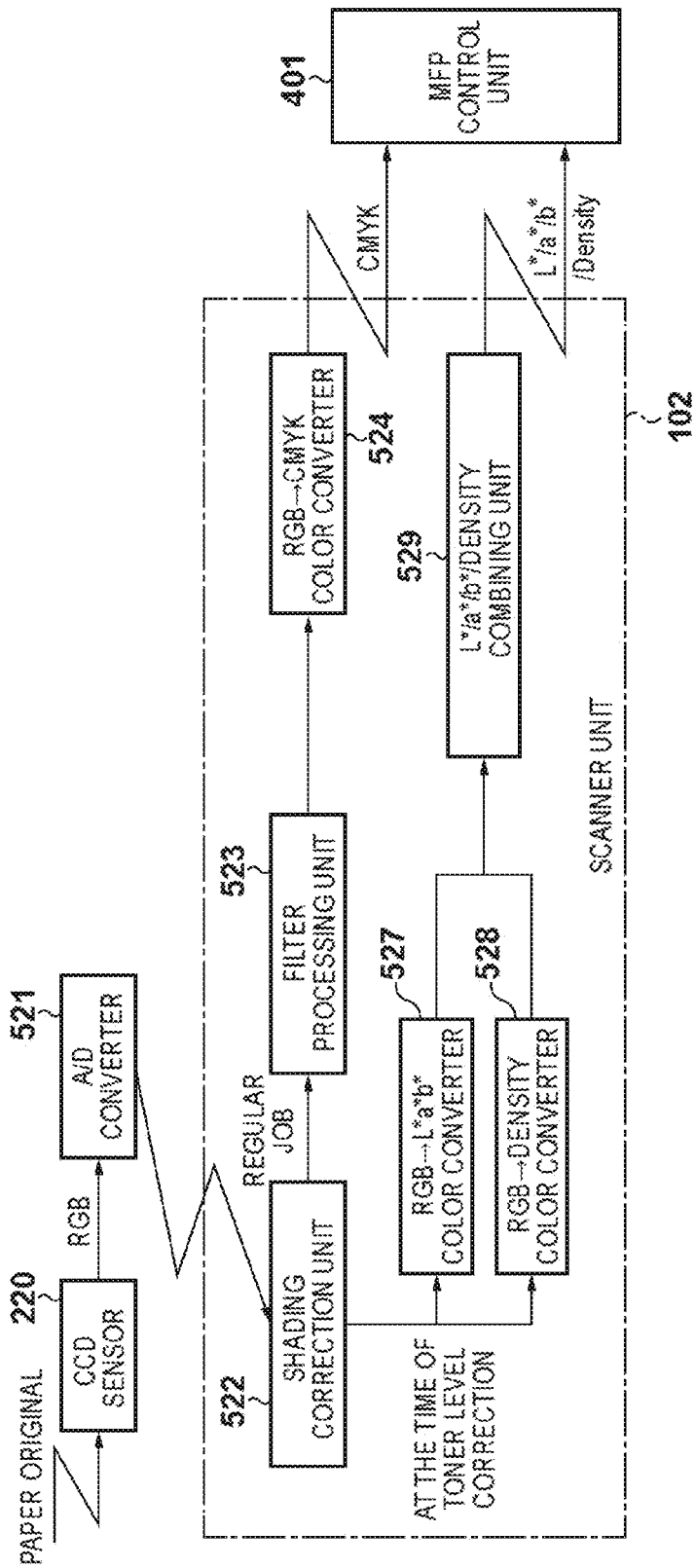
FIG. 5 is a schematic block diagram of an input image processing unit according to the first embodiment.

Next, a flow of image data in the scanner unit 102 and a configuration for controlling the scanner unit 102 are described with reference to FIG. 5. An image read with use of the RGB I-line CCD sensor 220 is converted into an electrical signal of 600 dpi and input into an A/D converter 512 as RGB image data. The A/D converter 512 performs gain adjustment and offset adjustment, and the input signal is converted into image data of 8-bit colors.

A shading correction unit 522 is an image processing block disposed in the scanner unit 102. The shading correction unit 522 corrects sensitivity variation in the pixel of the CCD sensor 220 and variation in the light amount of the original illumination lamp 205 using a reading signal of a reference white plate. In the case of ordinary copying processing, the subsequent processing of the shading correction processing is filter processing. A filter processing unit 523 performs convolution with a pixel of interest and a plurality of the surrounding pixels, and performs processing on an image acquired from the CCD sensor 220 to sharpen the image. A RGB→CMYK color converter 524 performs color conversion of a reader RGB signal that has been input into printer CMYK with use of a multidimensional direct mapping method. The converted printer CMYK information proceeds to the output image processing unit 412 via the MFP control unit 401.

The color material amount correction related to the present embodiment is used when implementing conversion of RGB into L*a*b*color and conversion of RGB into density and analyzing the amount of color material, after the correction by the shading correction unit 522. These data are combined by an L*a*b*density combining unit 529, and, similarly to the CMYK data, is transmitted to the output image processing unit 412 via the MFP control unit 401.

Configuration for Controlling RIP Unit

Figure 6:
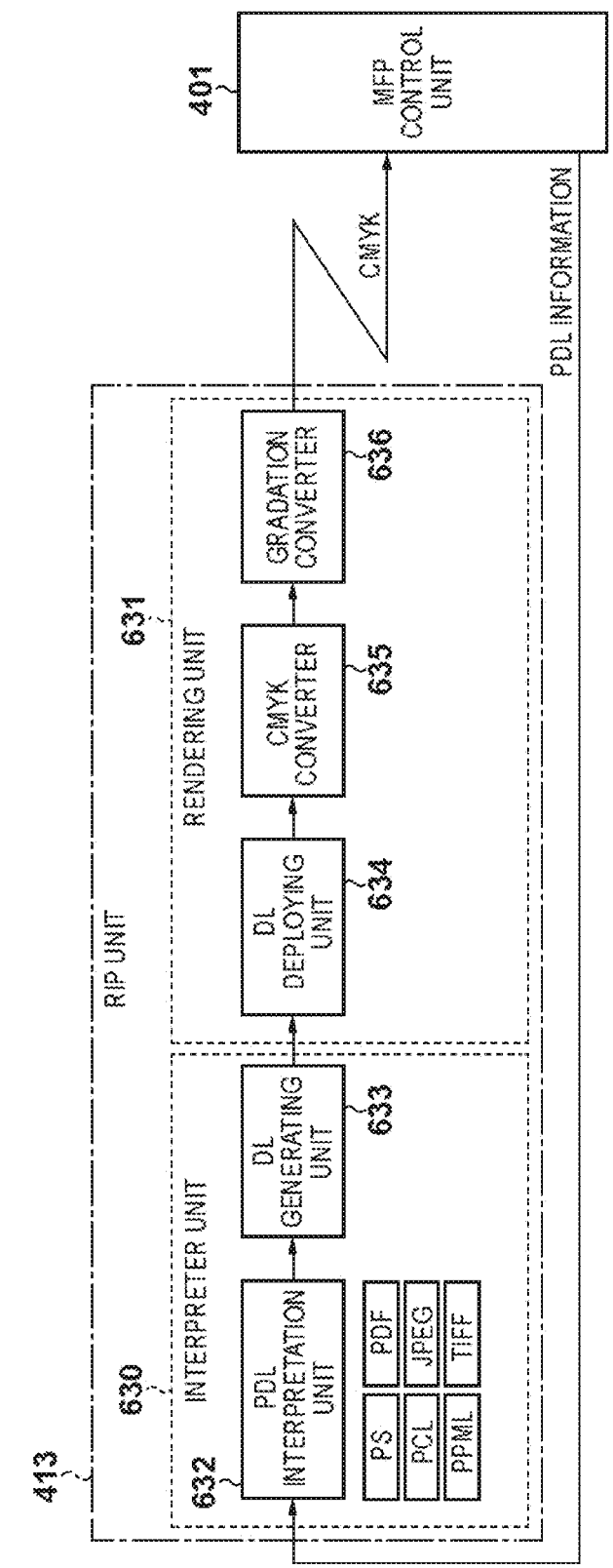
FIG. 6 is a schematic block diagram of a RIP unit according to the first embodiment.

Next, a configuration for controlling the RIP unit 413 is described below with reference to FIG. 6. RIP (raster image processor) is a processor for deploying information on each object as a bitmap (raster image) on a memory in order to reproduce, on a page at the same time, vector information of characters, line images, graphics, and the like that are described in PDL (page description language), or image scanning line information of colors, patterns, photographs, and the like. Although RIP was conventionally mounted in an output apparatus as hardware, nowadays, it is realized by software due to increased CPU speeds.

Generally, the RIP unit 413 is constituted of two portions: an interpreter unit 630 and a rendering unit 631. The interpreter unit 630 includes a PDL interpretation unit 632 that translates PDL and a DL (display list) producing unit 633 that produces an intermediate file called a display list from the interpreted PDL data. On the other hand, the rendering unit 631 includes a DL deploying unit 634 that deploys a display list to a bitmap (raster image) and a CMYK converter 635 that converts input color information into printer CMYK, such conversion as RGB→CMYK or C'M'Y'K'→CMYK. Additionally, the rendering unit 631 includes a gradation converter 636 that performs luminance adjustment or tone curve adjustment, which are instructed from a user.

The PDL interpretation unit 632 is a portion for analyzing various types of PDL data that has been input with respect to the display list. Examples of popular input formats are Post-Script (registered trademark) language of Adobe Systems Incorporated, PCL (printer control language) of HP (Hewlett-Packard) Company, and the like. These are written by printer control codes for creating an image per page, and graphic drawing codes, photographic image codes as well as simple character codes are included. Also, a file format for displaying a document, which is called PDF (portable document format) developed by Adobe Systems Incorporated, is often used in various industries, and this format that is directly input to the MFP without a driver is also targeted. In addition, the PDL interpretation unit 632 also deals with a format called PPML (personalized print markup language) for VDP (variable data print), a compressed format of an color image, which is called JPEG (joint photographic experts group) or TIFF (tagged image file format), and the like.

Configuration for Controlling Output Image Processing Unit

Figure 7:
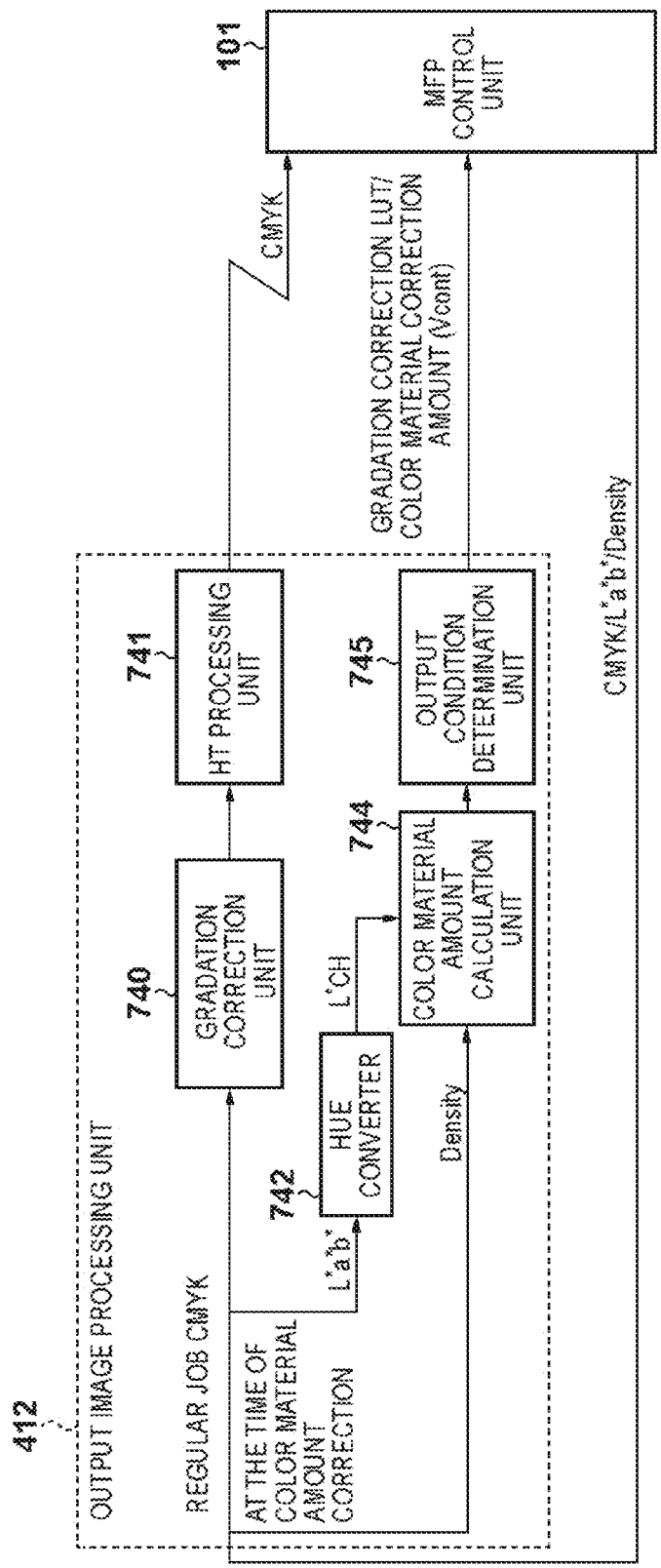
FIG. 7 is a schematic block diagram of an output image processing unit according to the first embodiment.

Next, a configuration of the output image processing unit 412 is described with reference to FIG. 7. In the output image processing unit 412, a processing block for the time of regular imaging is different from a processing block for the time of color material amount correction. The output image processing unit 412 to which CMYK image data for regular imaging is input from the MFP control unit 401 corrects the CMYK image data every HT (halftone) processing with a gradation correction unit 740 using a gradation correction table (one dimensional LUT, hereinafter, referred to as "γLUT") that is held so that the data has desired gradation characteristics.

A HT processing unit 741 forms a screen image of 134 lpi (line per inch), 166 lpi, or the like with an image processing unit that executes pseudo-halftone processing using a multi-level dithering method. Since density gradation of a printer engine is different depending on a screen, it is necessary to prepare a γLUT every dithering.

On the other hand, at the time of color material amount correction, L*a*b*data converted with the scanner unit 102 is converted into the hue (h) using a following equation, and is sent to a color material amount calculation unit 744.

$$h=\tan^{-1}(b^*/a^*)[\text{degree}] \quad \text{(Equation 1)}$$

Similarly, density data converted with the scanner unit 102 is also sent to the color material amount calculation unit 744.

The color material amount calculation unit 744 calculates the amount of color material for each test pattern using the above-mentioned hue (h) information and the density information, and sends the result to an output condition determination unit 745. The output condition determination unit 745 analyzes the color material amount for each test pattern, calculates an appropriate Vcont value that is to be a target color material amount, and transmits the value to the resource management unit 409 or the printer unit 101 via the MFP control unit 401.

Method for Changing Color Material Amount

A method for changing the color material amount is generally performed by increasing a difference of voltages between a development voltage Vdc called Vcont (also referred to as development contrast) and exposure voltage (Vl). It is difficult to change the development voltage in the plane, particularly in depth direction of an image forming apparatus. Also, similarly, it is difficult to change charging bias that regulates dark voltage (Vd). On the other hand, since it is relatively easy to change the exposure voltage in the plane by changing laser power (hereinafter, "LPW"), in the present embodiment, one example for changing exposure voltage using LPW in order to change Vcont is described below.

Basic Flowchart of Color Material Amount Correction

Figure 8A:
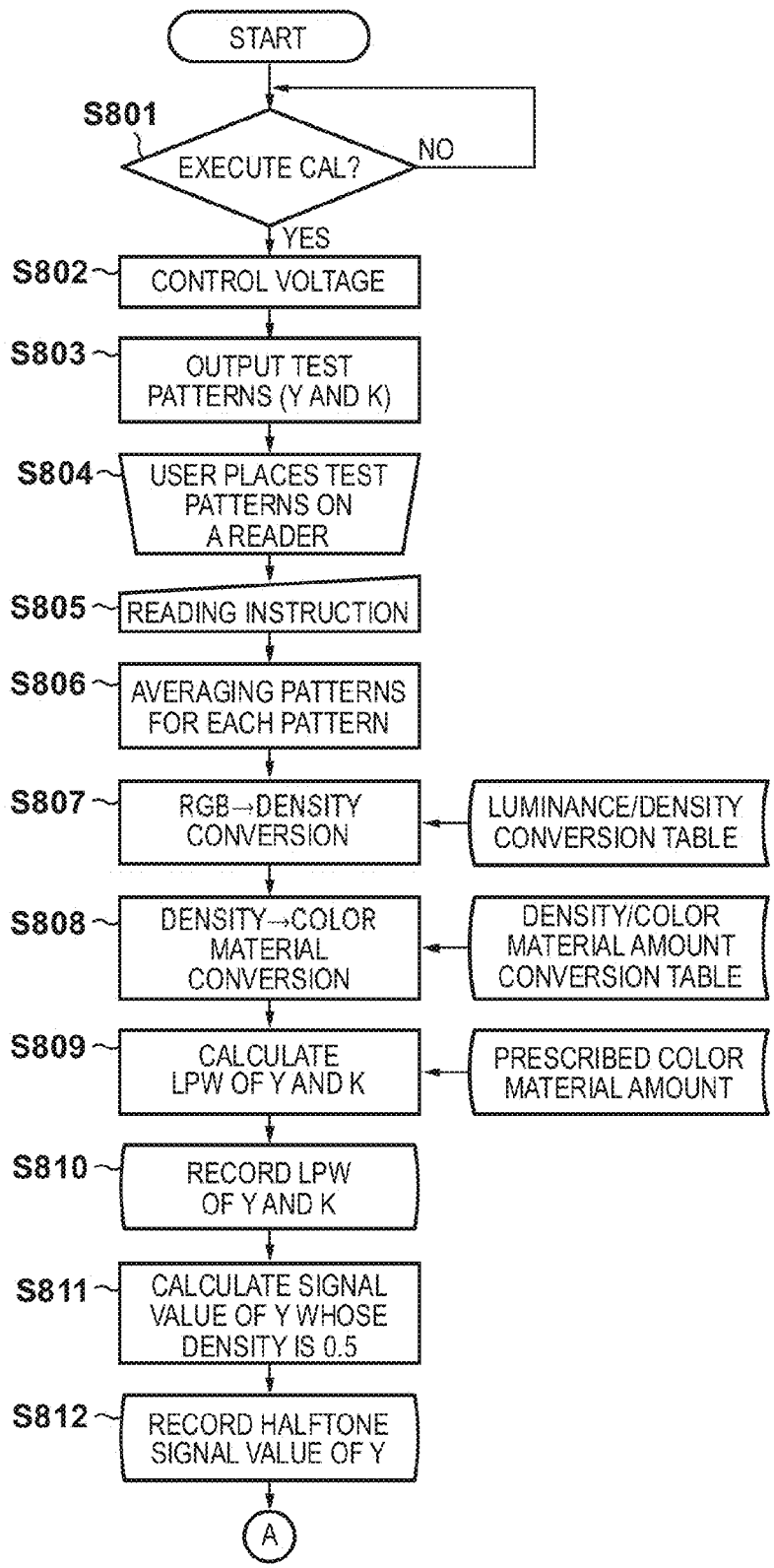

Next, a basic flowchart of color material amount correction according to the present embodiment is described with reference to FIGS. 8A and 8B. Note that color material amount correction processing described below is realized by the MFP control unit 401 (CPU) executing a program in an image forming apparatus. First, in step S801, the MFP control unit 401 determines whether or not execution of automatic gradation correction (color material amount correction) is instructed from an operation screen, and if the MFP control unit 401 determines that execution is instructed, then the procedure proceeds to step S802. In step S802, the MFP 401 executes potential controlling and prepares for outputting a test pattern in order to return an image forming condition to a standard image forming condition before outputting the test pattern.

Figure 9:
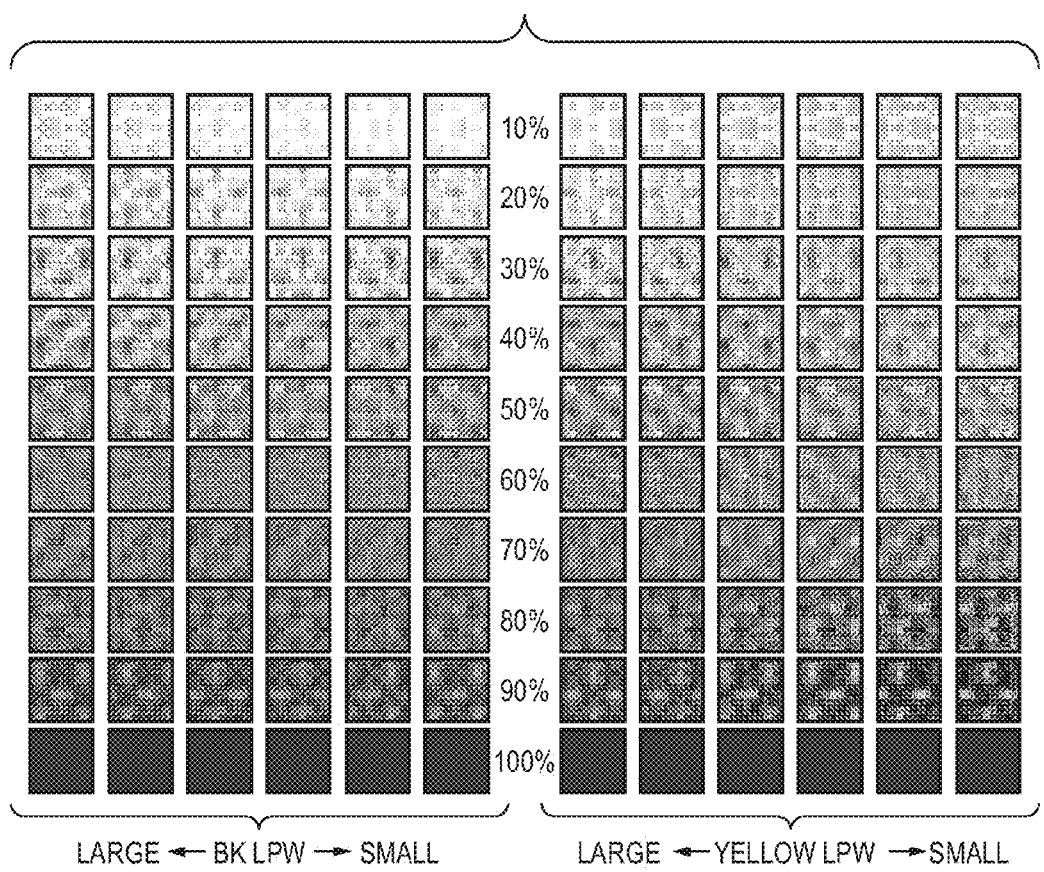
FIG. 9 is a schematic diagram showing test patterns at the time of determining the color material amounts of yellow and black according to the first embodiment.

When finishing the voltage control and determining an image forming condition, the MFP control unit 401 outputs a black or yellow test pattern in FIG. 9 with the printer unit 101 for detecting the color material amount to a standard paper sheet (for example, plain paper CS-814 made by Canon Corporation). As shown in FIG. 9, the test patterns are constituted of a plurality of single color pattern images in which the density of colors is gradually changed. The output test pattern images are placed on a reader (scanner unit 102) by a user in step S804, and in step S805, the MFP control unit 401 reads a test pattern using the scanner unit 102 in accordance with a reading instruction from an operation screen.

Next, in step S806, the MFP control unit 401 performs averaging processing for each pattern image based on the result of reading the test patterns that have been read, and converts RGB into the density in step S807. Here, a luminance/density conversion table stored in a memory or the like is used.

Next, in step S808, the MFP control unit 401 focuses on 100% signal portions (hereinafter, referred to as "solids") shown in FIG. 9, and converts the density of step S807 into color material amount information using a density/color material amount conversion table in which correlation data between the density value and the color material amount that is held in advance is defined. Subsequently, in step S809, the MFP control unit 401 calculates an exposure condition (LPW) of black and yellow in which the color material amounts will be prescribed values, and stores the calculated conditions in the resource management unit 409 in step S810. Additionally, in step S811, the MFP control unit 401 determines gradation whose density corresponds to 0.5 (condition is status A, for example) in halftone pattern images of yellow that are formed with the calculated LPW of yellow with a linear interpolation operation. Then, in step S812, similarly to LPW, the MFP control unit 401 stores the gradation of yellow as a halftone signal value in the resource management unit 409, and the procedure proceeds to step S831 described later. Note that regarding black, a halftone signal value is not stored.

Figure 10:
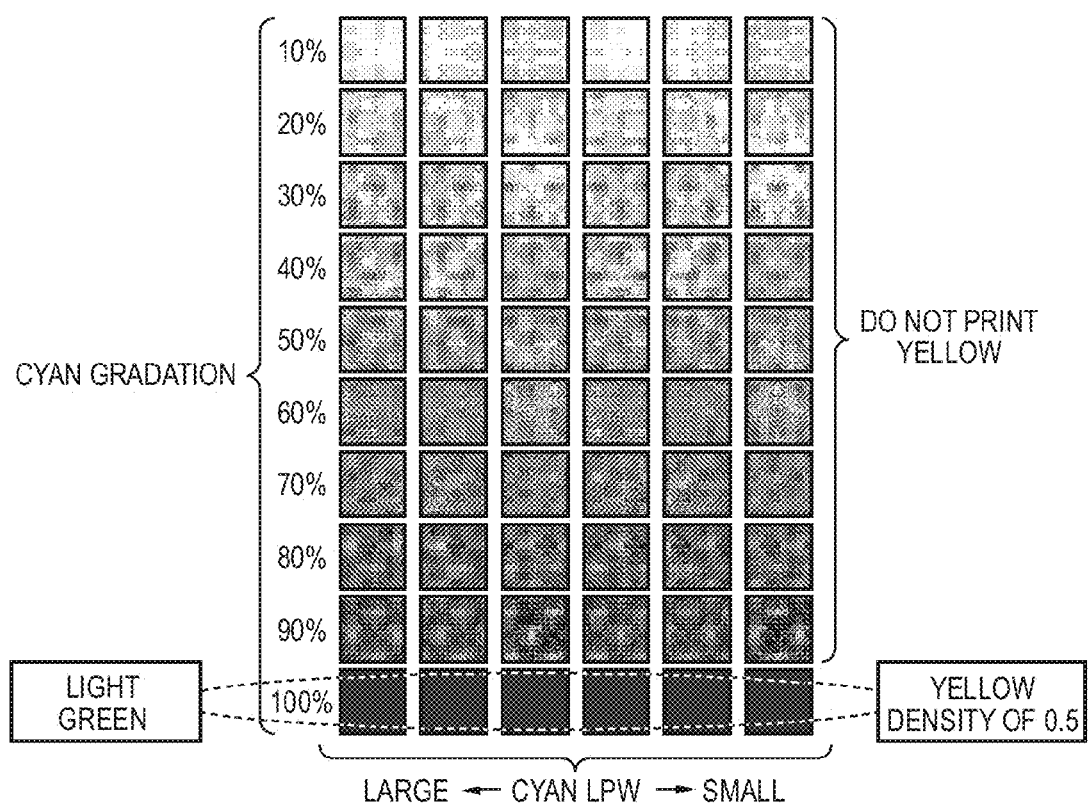
FIG. 10 is a schematic diagram showing a test pattern at the time of determining the color material amount of cyan according to the first embodiment.

In step S813, the MFP control unit 401 forms, as shown in FIG. 10, the determined yellow exposure condition and a yellow pattern image whose signal value has the density of 0.5, and superimposes a solid pattern image formed by changing the exposure condition of cyan on the formed yellow pattern image to form a mixed pattern image of light green. Also, similarly to the time of calculating a condition for yellow, although a halftone pattern image is output, yellow is not used in this halftone pattern image, and the halftone pattern image is formed with a single color of cyan. Note that, similarly to FIG. 9, the halftone pattern image is constituted of a plurality of single color pattern images in which the density is gradually changed.

In step S814, similarly to yellow, test pattern images are placed on a reader by a user. When a reading instruction from an operation screen is input in step S815, in step S816, the MFP control unit 401 performs averaging processing for each pattern image. Subsequently, in step S817, the MFP control unit 401 converts a pattern image on which C and Y are superimposed into L*a*b*information with a pre-stored RGB→L*a*b*conversion table. Additionally, in step S818, the MFP control unit 401 calculates the hue information using the above-mentioned Equation 1 regarding pattern image information converted into L*a*b*information.

Next, in step S819, the MFP control unit 401 calculates LPW of cyan in which the hue of the light green pattern image formed with the solid pattern image of cyan and the yellow pattern image of density of 0.5 will be the prescribed hue. Subsequently, in step S820, the MFP control unit 401 stores the LPW calculated in step S819 as LPW of cyan in the resource management unit 409. Similarly to yellow, in step S821, the MFP control unit 401 determines a pattern image whose density corresponds to 0.5 in halftone pattern images of cyan that are formed with the calculated LPW with the operation. Additionally, in step S822, the MFP control unit 401 stores the result in the resource management unit 409 as the exposure condition for cyan, and the procedure proceeds to step S831 described later.

Next, in step S823, the MFP control unit 401 creates a test pattern image constituted of C and M such that yellow is changed into cyan and cyan is changed into magenta in FIG. 10. The test pattern image is a mixed pattern image of light blue created by forming a cyan pattern image that has the determined cyan exposure condition and a signal value of the density of 0.5, and superimposing a solid pattern image formed by changing the exposure condition of magenta on the formed cyan pattern image. Also, similarly to the time of calculating a condition for cyan, although a halftone pattern image is output, cyan is not used in this halftone pattern image, and the halftone pattern image is formed with a single color of magenta.

Hereinafter, since the flow from steps S824 to S828 is the same as the flow from steps S814 to S818 at the time of cyan calculation, the description thereof is omitted. Subsequently, in step S829, the MFP control unit 401 calculates LPW that will be prescribed hue in the hue of the light blue pattern image formed with the solid pattern image of magenta and the cyan pattern image of density of 0.5. Additionally, in step S830, the MFP control unit 401 stores the result in the resource management unit 409 as the exposure condition for magenta, and the procedure proceeds to step S831 described later.

With processes described so far, LPWs for colors are determined. There is a case where gradation characteristics changes since Vcont is changed using LPW in order to hold the color material amounts as prescribed conditions. Thus, in step S831, the MFP control unit 401 extracts a RGB luminance average value with LPW determined for each color, executes density conversion in step S832, and creates a γLUT such that the gradation will be a prescribed gradation target (in the present invention, 15% dot gain curve) in step S833. Similarly to LPW, a γLUT is recorded in the resource management unit 409 and used for gradation correction at the time of subsequent regular image formation.

As described above, according to the automatic gradation correction according to the present embodiment, the amount of color material is grasped using the density of yellow and black, and Vcont (LPW) is adjusted such that the color material amount will be the prescribed color material amount. Additionally, cyan is mixed with halftone of yellow and magenta is mixed with halftone of cyan, and the color material amount is grasped with the hue of a secondary color, and Vcont (LPW) is adjusted such that the color material amount will be the prescribed color material amount.

Principle for Deriving Color Material Amount with Hue Information

Figure 11:
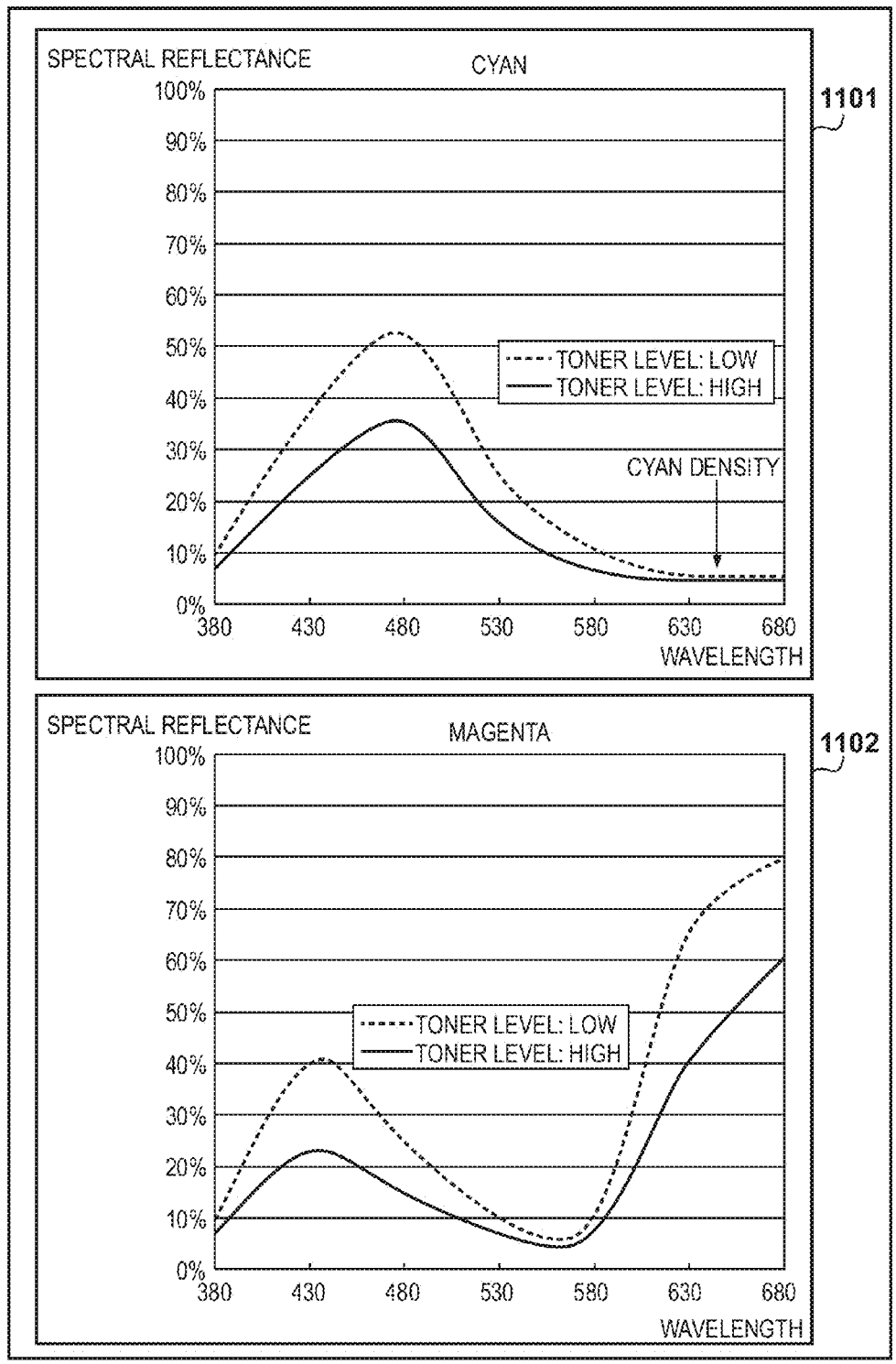
FIG. 11 is an illustrative diagram of spectral reflectance characteristics according to the first embodiment.
Figure 12:
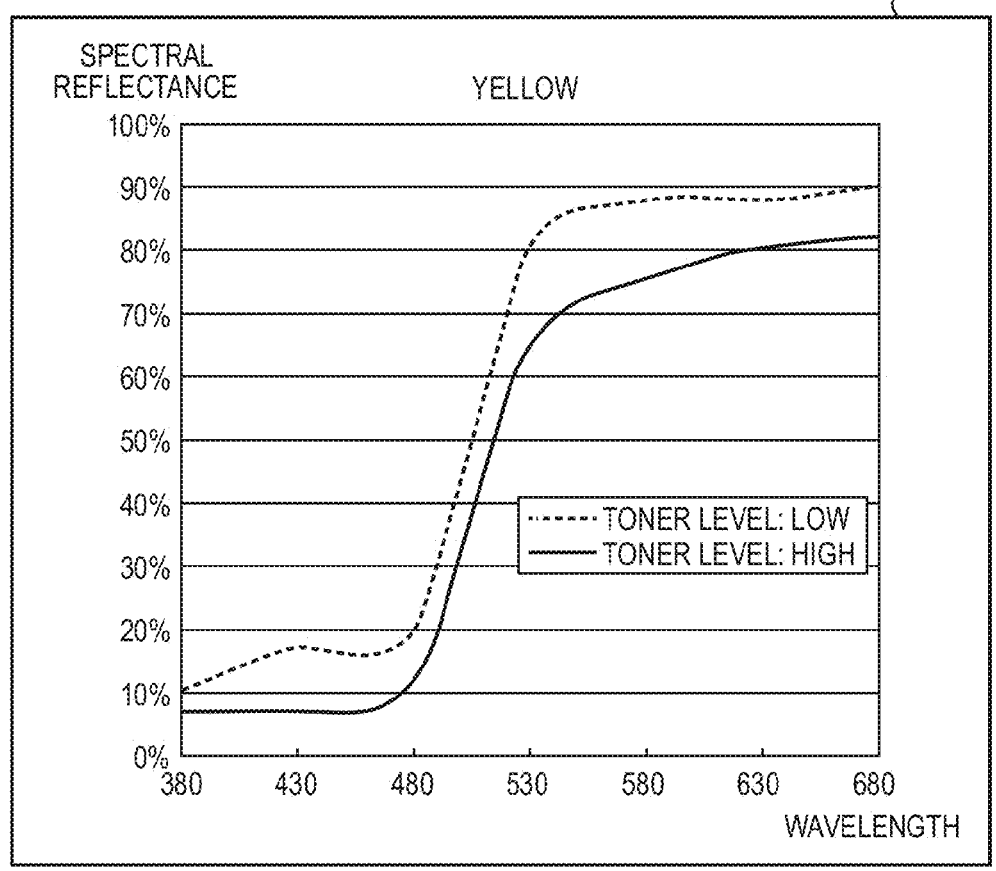
FIG. 12 is an illustrative diagram of spectral reflectance characteristics according to the first embodiment.
Figure 13:
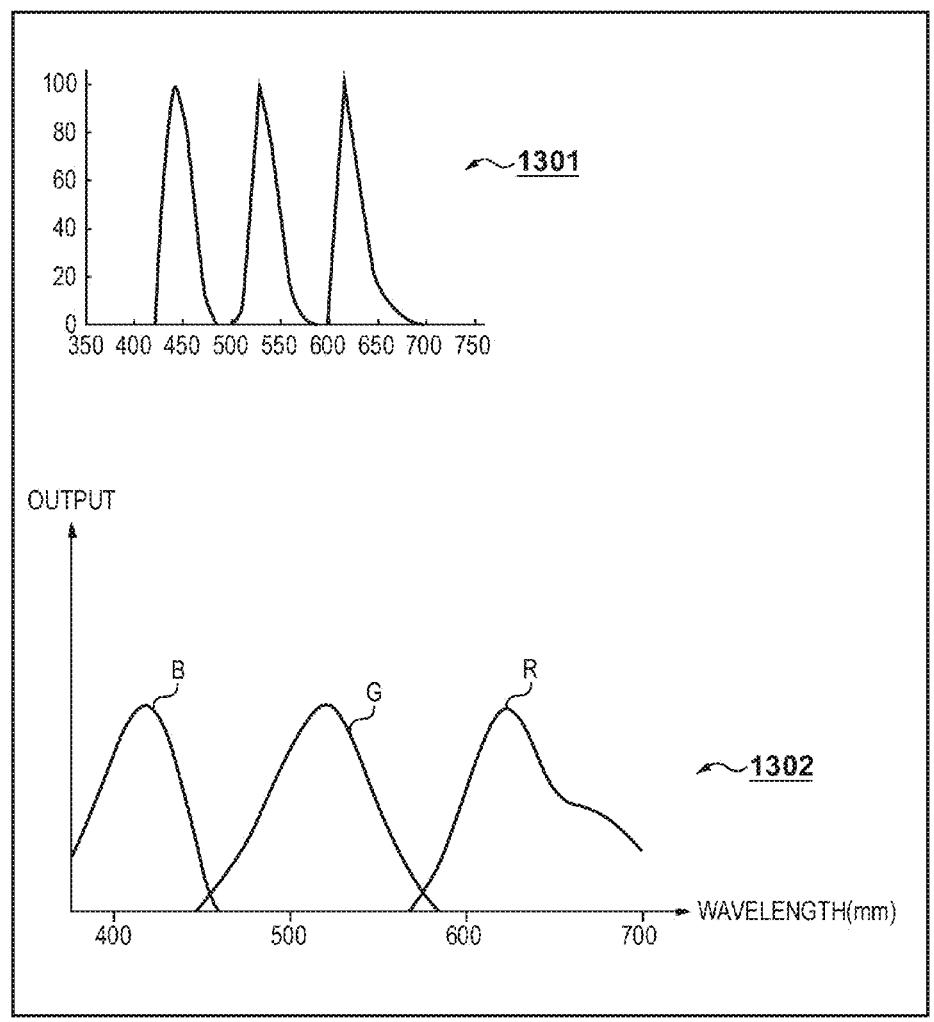
FIG. 13 is an illustrative diagram of spectral sensitivity characteristics of a status A and a reader according to the first embodiment.

Next, the principle for deriving the color material amount with hue information used for cyan and magenta is described. FIGS. 11 and 12 show, as a graph, differences of spectral reflectance between when the color material amount is high and the color material amount is low in solid portions of cyan, magenta, or yellow. In FIGS. 11 and 12, the horizontal axis indicates the wavelength and the vertical axis indicates the spectral reflectance characteristics. Also, reference numeral 1301 of FIG. 13 represents the spectral sensitivity characteristics of the status A density, and reference numeral 1302 represents the spectral sensitivity characteristics (total sensitivity of power source and light receiving unit) of a reading unit of the present embodiment.

In the case where color development of pure cyan is sought, the spectral reflectance characteristics such that absorption of red around 650 nm is only dominant are desired. However, if the color material amount is high, then the reflectance of green (around 480 nm) decreases, but the reflectance of blue is relatively maintained, and thus the hue changes from cyan to blue. As shown in reference numeral 1101 of FIG. 11, when the toner level of "low" is compared with the toner level of "high", the reflectance around 630-650 nm where the cyan density or the red luminance of a reader is detected has only very slight reflectance changes. In other words, it is seen that highly precise detection that enables the color material amount to be grasped is not achieved with the density (includes density calculated from the luminance) in high density portions.

As shown in reference numeral 1102 of FIG. 11, in the case of magenta, if the color material amount is high, then the absorption of blue increases, but the reflectance of red is relatively maintained. Namely, if the color material amount is high, then hue changes from magenta to red. Also, similarly to cyan, it is seen that the color material amount cannot be detected with the density (includes density calculated from the luminance) since the reflectance around 530 nm does not decrease so much, and the resolution for detecting the color material amount is not sufficiently obtained with the density around this region or the green luminance of a reader.

As shown in reference numeral 1103 of FIG. 12, yellow has the spectral reflectance characteristics that are close to the spectral reflectance characteristics in the ideal state in which the absorption occurs in only a blue region, and if the color material amount changes, then the luminance slightly decreases, but the hue does not change so much. It is possible to sufficiently make a determination with the degree of a drop in the reflectance in only a blue region and make a determination of the color material amount even with the density.

The spectral reflectance of black is flat (not shown), the color material amount of black does not change the hue, and black has characteristics such that the absorption of visible light increases overall. Accordingly, similarly to yellow, it is possible to make a determination of the color material amount with the density. Also, unlike yellow, since the dynamic range of luminance can be secured, the color material amount may be determined with the luminance (L*).

From the relation described above, it is seen that cyan and magenta have the low detection resolution in high density portions due to the spectral reflectance characteristics. If the resolution is low, then the density is influenced by variations caused by electrical noises or lifting of test patterns, leading to the unevenness of the color material amount. The dominant factor in this tendency is the fact that a single spectrum is seen, rather than a difference in performance of a spectrophotometer or a reader. For example, a system (conventional automatic gradation correction) in which a luminance value that is in a complementally relation is extracted from the status A density or RGB of a reader and the density is converted fits this tendency.

Figure 14:
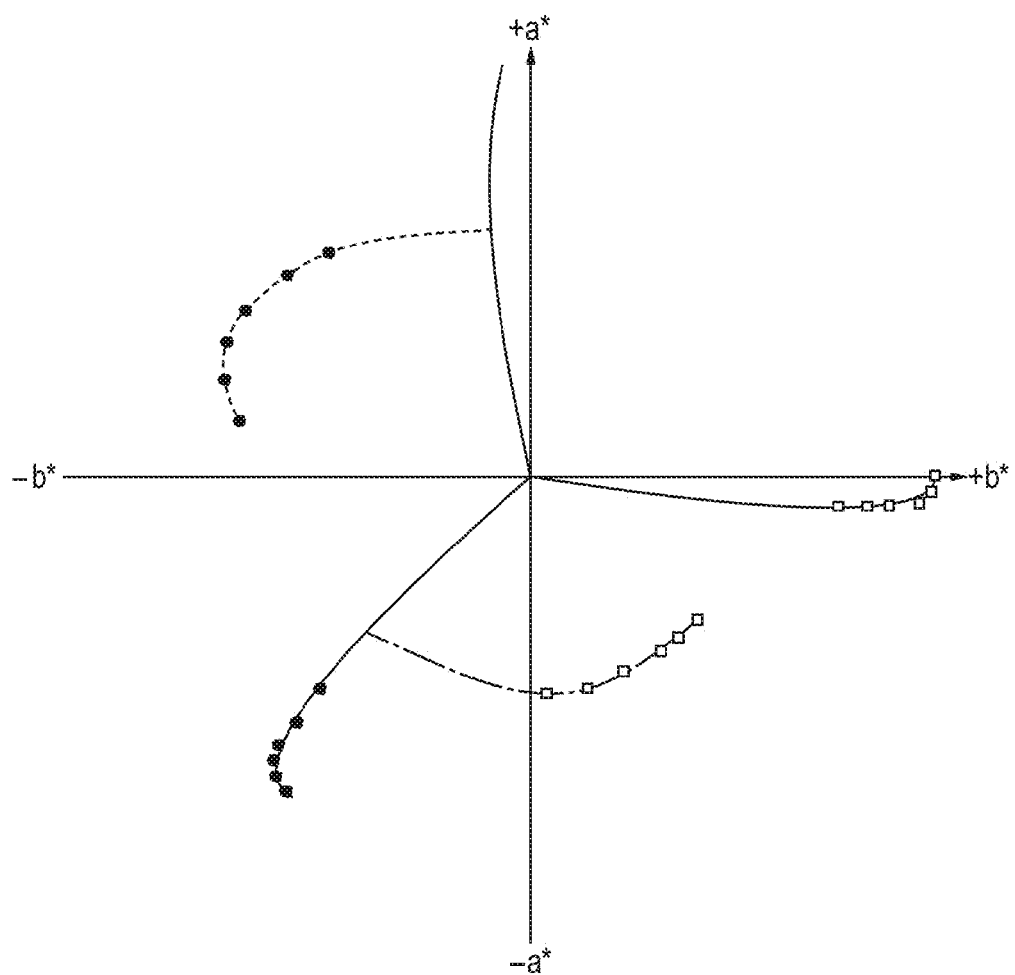
FIG. 14 is an illustrative diagram of chromaticity trances at the time of mixing colors according to the first embodiment.

FIG. 14 shows a*b*space of CIE L*a*b*space. Solid lines indicate chromaticity trances (color material amount and chromaticity) formed with cyan (●) and magenta (□) on a color copy paper CS-814 (white pure paper) made by Canon Corporation. It is seen that if the color amount is high, cyan changes in the direction of blue and magenta changes in the direction of red, in other words, in the hue direction. These changes in the hue direction mainly depend on the types of pigments or resins, and the hue change amount and the direction also change depending on the materials used.

Dotted lines indicate chromaticity trances of a pattern image produced by mixing yellow halftone whose density of 0.5 with cyan solid whose color material amount is changed and a pattern image produced by mixing cyan halftone whose density of 0.5 with magenta whose color material amount is changed. Even if the applied amounts of single colors are added with the same Vcont, the amount of change of chromaticity is greater in mixed colors (dotted lines) than in single colors (solid lines) on the white pure paper CS-814.

Figure 15:
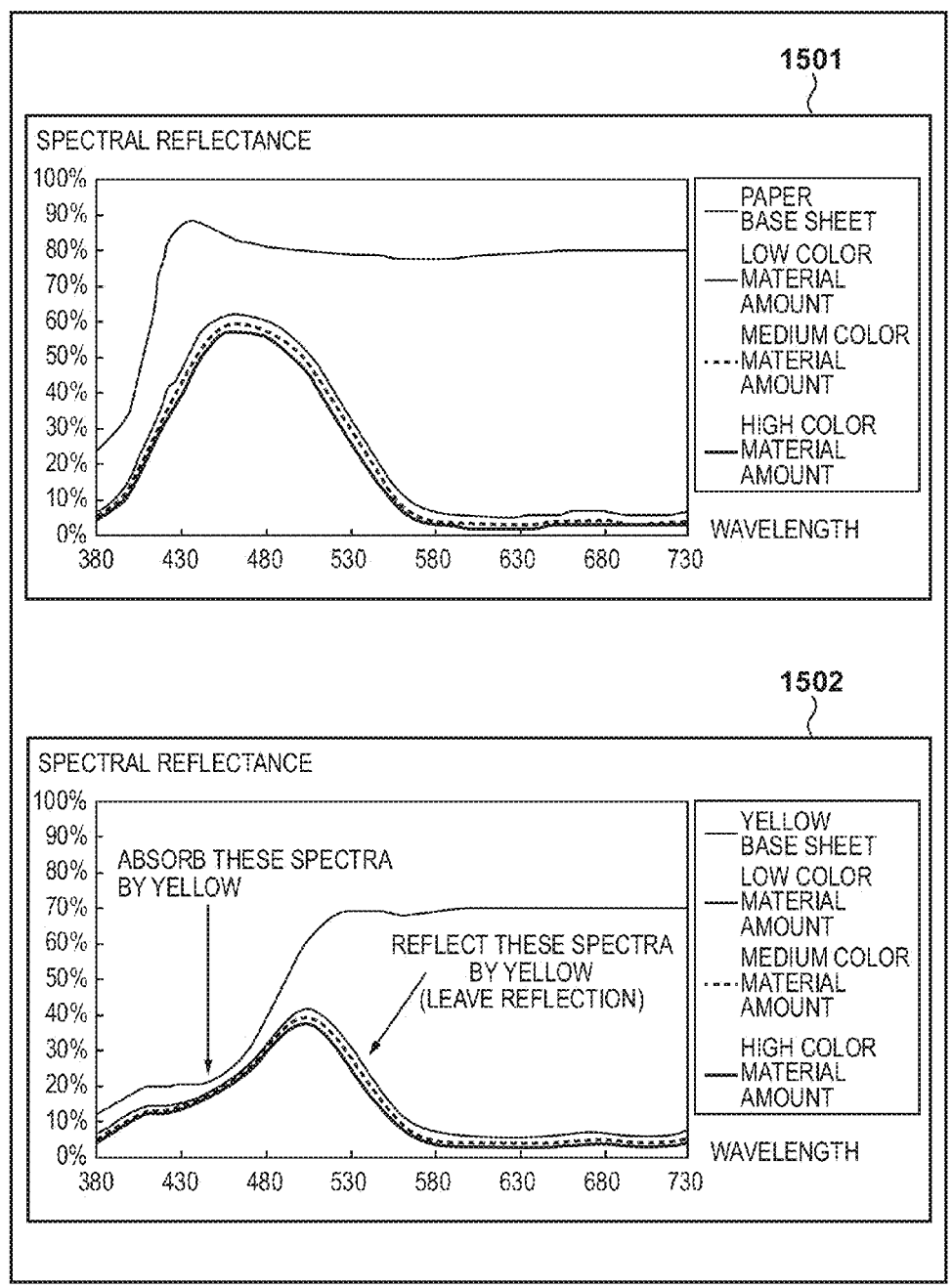
FIG. 15 is an illustrative diagram of spectral reflectance characteristics according to a second embodiment.

In FIG. 15, this phenomenon is expressed with the spectral reflectance. FIG. 15 shows, when the color material amount of cyan is changed in three levels (0.45, 0.50, and 0.55 mg/cm$^2$), reference numeral 1501 in which the base is only a white paper sheet and reference numeral 1502 in which yellow is mixed. As shown in the reference numeral 1501, the spectral reflectance of cyan on the white (W) base has week absorption around 430-500 nm. Also, as shown in the reference numeral 1502, if yellow is mixed, a short wavelength (blue) region is absorbed a lot, and wavelength regions around 500 nm (green) that are not absorbed remain. Green is developed by this left reflectance portion.

A portion of interest is a portion around 450 nm that is forcibly absorbed by yellow. This portion has little change in the spectral reflectance even if the color material amount is changed. On the other hand, around 450 nm with the W base, the spectral reflectance changes according to the color material amount. Namely, as a result of light being forcibly absorbed by yellow, the shape of reflectance peak is changed to a distorted shape. In this way, if the shape of reflectance peak is changed to be a distorted shape, the hue changes. In the case of the reference numeral 1502, the hue is changed from green to blue.

Figure 16:
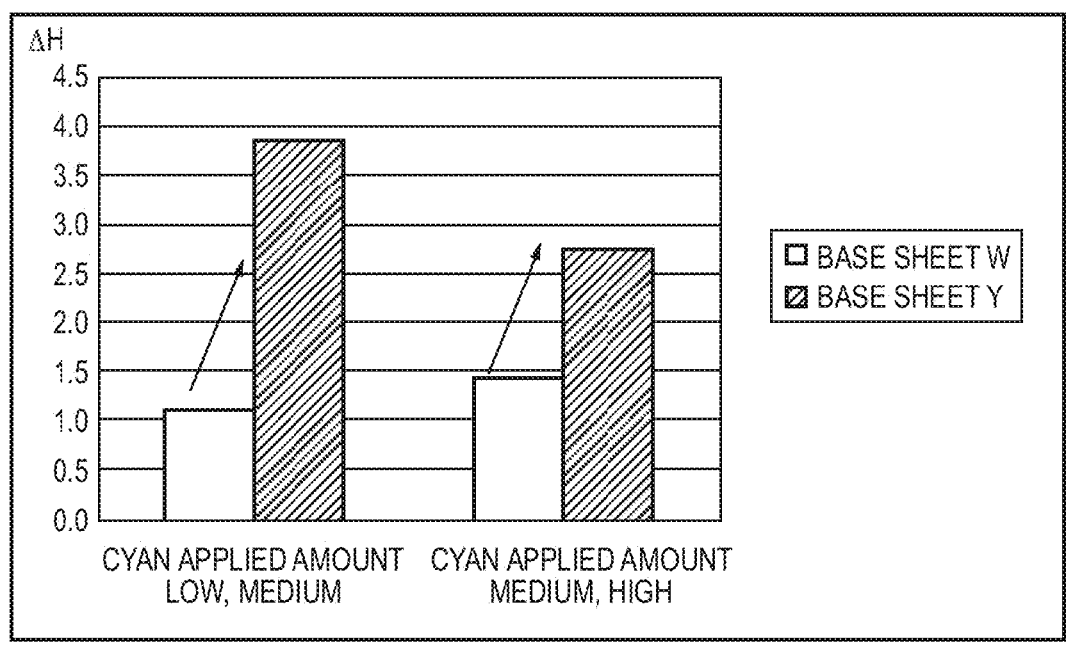
FIG. 16 is an illustrative diagram showing hue change according to the second embodiment.

FIG. 16 shows a comparison of the degree of forcible hue change between this W base and yellow base. In FIG. 16, the vertical axis indicates hue differences generated by the cyan applied amount of "low" and "medium", and "medium" and "high", and it is seen that even though the same color material amount is changed, the hue change of yellow base is greater than the W base. In this invention, this phenomenon is used to perform precise maximum color material amount correction. With this phenomenon, in the case where a material (pigment, resin, or the like) whose hue changes is changed, it is importance to grasp the amount of hue change and the directionality thereof.

With the hue changes around the maximum color material amount for each color used in the present invention, the hue change of cyan is less than the hue change of blue and the hue change of magenta is less than the hue change of red for yellow base. For example, if cyan is to change the hue to green whose hue is opposite to cyan, then a magenta base can be mixed with cyan instead of yellow. Similarly, if magenta is to change the hue to blue that is opposite to the present embodiment, then a yellow base can be mixed instead of cyan. Additionally, the case of a color material such as black toner that does not change the hue also requires attention. Since a hue change, although slight, occurs with a single color, a hue change also occurs with two colors. Namely, in the case where the hue change is generated with a single color, it is desired to apply the present invention.

These application conditions are summarized below. 1. The case where a hue change is marked around the maximum color material amount of a color. 2. The case where direction of the hue change of a color can be grasped. 3. The case where the measurement resolution with the hue emphasized with the above-mentioned two colors is higher than the measurement resolution with a single color regarding the density, the lightness, the saturation, and the like. If the above-mentioned 1-3 are met, it is desired to apply the present invention.

As described above, an image forming apparatus according to the present embodiment outputs a test chart on which a plurality of colors are superimposed with a color printer unit, and converts the test chart into the hue information with a color reader provided in the image forming apparatus. Additionally, imaging conditions (determined with Vcont (in the case of image exposure method, development voltage (Vdc)) and exposure amount) are changed such that the color material amount will be a prescribed condition. Accordingly, the present embodiment can prevent image defects or failures such as spattering, poor fixation, or the like by executing precise maximum color material amount correction using the hue change of two colors.

Second Embodiment

Hereinafter, a second embodiment of the present invention is described. In the above-described first embodiment, it is assumed that a standard paper sheet (for example, plain paper CS-814 made by Canon Corporation) is the medium for calculating the maximum color material amount. Using the standard paper sheet, first, cyan is corrected with the density of yellow as a reference, and magenta is corrected after cyan is adjusted in order to detect the hue mixed with another color. Although a conventional method is used since the resolution in relatively high density portions is maintained with yellow, it is possible that yellow is influenced by variation between pages or in-plane uniformity of the printer unit. Thus, in the present embodiment, CAL-dedicated paper serving as paper for the automatic gradation correction is used in order to remove variation of the printer unit.

For example, at the time of cyan color material amount correction, Cannon PPC color (colored paper) 64 g/m$^2$ cream may be used, and at the time of magenta color material amount correction, blue may be used. However, it is necessary to grasp the spectral reflectance, calculate a relationship between the color material amount and the hue, and update prescribed hue values in the resource management unit 409 in advance. Also, even in a case of the gradation correction (γLUT creation), as in Japanese Patent Laid-Open No. 2010-52304, by converting the density into the halftone dot percentage and changing a halftone dot percentage to a prescribed target (15% dot gain), gradation is corrected such that the colored paper satisfies a prescribed target.

Third Embodiment

Hereinafter, a third embodiment of the present invention is described with reference to FIG. 17. In the above-mentioned second embodiment, correction is performed using a plurality of colored paper. Since there are issues in usability, a configuration is changed to one paper sheet. FIG. 17 shows CAL-dedicated paper used in the present embodiment.

A pattern image of yellow and a pattern image of cyan whose density is checked to be a prescribed density (0.48±0.01) are printed on A3 size paper, and at the time of the color material correction of the printer unit 101, LPWs of cyan and magenta are adjusted using this paper. It is possible to reduce output of three paper sheets, which is described in the above-mentioned first embodiment, to one sheet by securing a space where a test chart of black and yellow shown in FIG. 9 can be printed on the lower side of this CAL-dedicated paper. Note that the present CAL paper is not provided with grid lines. Also, as an innovation of the present embodiment, taking registration shift of paper into consideration, an average value of read values of a reader 3 mm inside (predetermined margin) an edge of the pattern image is used. Further, it is taken into consideration that fixation is performed a plurality of times, and thus the density of CAL-dedicated paper is set slightly low.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-227432 filed on Oct. 14, 2011, which is hereby incorporated by reference herein in its entirety.

What is claimed is:

1. An image forming apparatus that forms an image using color materials of a plurality of colors, the image forming apparatus comprising:
   an image forming unit that forms a test pattern on printing material using the color materials of a plurality of colors;
   a reading unit that reads the test pattern formed by the image forming unit on the printing material; and
   a control unit that controls an amount of color material of each color by changing an image forming condition in accordance with a result of reading by the reading unit,
   wherein the image forming unit forms a mixed pattern image, as the test pattern, in which color materials of a plurality of chromatic colors are used,
   the control unit controls an amount of color material of a single color based on a result of reading the mixed pattern image by the reading unit,
   the image forming unit forms a mixed pattern image and a plurality of single color pattern images as pattern images for controlling an amount of color material that has a characteristic of a hue change amount being marked around a maximum amount of color material among the color materials of the image forming apparatus, and
   the image forming unit forms a plurality of single color pattern images as pattern images for controlling an amount of color material that has a characteristic of a hue change amount being smaller than a hue change amount of the mixed pattern image around the maximum amount of color materials among the color material of the image forming apparatus.

2. The image forming apparatus according to claim 1, wherein the color material for forming the mixed pattern image and controlling the amount of color material further has at least one of a characteristic of enabling a direction of a hue change to be grasped and a characteristic of a measurement resolution with a mixed color being greater than a measurement resolution with a single color related to density, lightness, or saturation.

3. The image forming apparatus according to claim 1,
   wherein the color materials of the image forming apparatus includes black, yellow, cyan, and magenta, and
   the color materials for forming the mixed pattern image and controlling the amount of color materials include cyan and magenta.

4. The image forming apparatus according to claim 3,
   wherein the mixed pattern image for controlling the color material amount of cyan is a secondary color obtained by mixing yellow and cyan, and
   the mixed pattern image for controlling the color material amount of magenta is a secondary color obtained by mixing cyan and magenta.

5. The image forming apparatus according to claim 1, further comprising:
   an image carrier;
   a charging unit that charges the image carrier uniformly;
   an exposure unit that forms an electrostatic latent image by exposing a surface of the image carrier charged by the charging unit;
   a development unit that develops the electrostatic latent image formed on the image carrier by the exposure unit using color material; and
   a transfer unit that transfers a developer image on the image carrier that is developed by the development unit to printing material,
   wherein the control unit controls an amount of color material of each color by controlling laser power during exposure by the exposure unit.

6. An image forming apparatus that forms an image using color materials of a plurality of colors, the image forming apparatus comprising:
   an image forming unit that forms a test pattern on printing material using the color materials of a plurality of colors;
   a reading unit that reads the test pattern formed by the image forming unit on the printing material; and
   a control unit that controls an amount of color material of each color by changing an image forming condition in accordance with a result of reading by the reading unit,
   wherein the image forming unit forms a mixed pattern image by forming the test pattern on printing material of a chromatic color,
   the control unit controls an amount of color material of a single color based on a result of reading the mixed pattern image by the reading unit,
   the image forming unit forms a mixed pattern image and a plurality of single color pattern images as pattern images for controlling an amount of color material that has a characteristic of a hue change amount being marked around a maximum amount of color material among the color materials of the image forming apparatus, and
   the image forming unit forms a plurality of single color pattern images as pattern images for controlling an amount of color material that has a characteristic of a hue change amount being smaller than a hue change amount of the mixed pattern image around the maximum amount of color materials among the color material of the image forming apparatus.

7. An image forming apparatus that forms an image using color materials of a plurality of colors, the image forming apparatus comprising:
   an image forming unit that forms a test pattern on printing material using the color materials of a plurality of colors;
   a reading unit that reads the test pattern formed by the image forming unit on the printing material; and
   a control unit that controls an amount of color material of each color by changing an image forming condition in accordance with a result of reading by the reading unit,
   wherein the image forming unit forms a mixed pattern image by superimposing the test pattern on printing material on which a pattern image of a chromatic color is formed,
   the control unit controls an amount of color material of a single color based on a result of reading the mixed pattern image by the reading unit,
   the image forming unit forms a mixed pattern image and a plurality of single color pattern images as pattern images for controlling an amount of color material that has a characteristic of a hue change amount being marked around a maximum amount of color material among the color materials of the image forming apparatus, and
   the image forming unit forms a plurality of single color pattern images as pattern images for controlling an amount of color material that has a characteristic of a hue change amount being smaller than a hue change amount of the mixed pattern image around the maximum amount of color materials among the color material of the image forming apparatus.

8. The image forming apparatus according to claim 7, wherein when reading the test pattern formed by being superimposed on the pattern image of a chromatic color, the reading unit provides a predetermined margin from an edge of the pattern image included in the test pattern, and outputs an average value of read values inside the margin.

9. An image forming apparatus, comprising:
an image forming unit configured to form an image using color materials of a plurality of colors, the color materials of a plurality of colors including a first color material of a first color and second color materials of second colors;
a reading unit configured to read the image formed by the image forming unit; and
a determining unit configure to:
cause the image forming unit to form a plurality of mixed patterns corresponding to a combination of the first color material including a predetermined amount and each of the second color materials including a different amount, and
determine an image forming condition for the second color materials based on read data obtained by the reading unit reading the plurality of mixed patterns.

10. The image forming apparatus according to claim 9, wherein
the determining unit generates hue data from the read data, and determines the image forming condition for the second color materials based on the hue data.

11. The image forming apparatus according to claim 9, further comprising
a photosensitive member; and
an exposure unit configured to expose the photosensitive member,
wherein the image forming condition is an exposing condition of the exposure unit.

12. The image forming apparatus according to claim 9, wherein
the determining unit causes the image forming unit to form a plurality of a single color patterns corresponding to the first color materials including a different amount, determines the image forming condition for the first color material based on read data obtained by the reading unit reading the plurality of single color patterns, and determines pattern data corresponding to the first color material including a predetermined amount.

13. The image forming apparatus according to claim 12, wherein
the determining unit generates density data from the read data obtained by the reading unit reading the plurality of single color patterns, and determines the image forming condition for the first color material based on the density data.

14. The image forming apparatus according to claim 13, wherein
the first color is yellow, and
the second color is cyan.

15. A method for determining an image forming condition of an image forming apparatus including an image forming unit configured to form an image using color materials of a plurality of colors, the color materials of a plurality of colors including a first color material of a first color and second color materials of second colors, and a reading unit configured to read the image formed by the image forming unit, the method comprising;
causing the image forming unit to form a plurality of mixed patterns corresponding to a combination of the first color material including a predetermined amount and each of the second color materials including a different amount; and
determining an image forming condition for the second color materials based on read data obtained by the reading unit reading the plurality of mixed patterns.

* * * * *